United States Patent
Oku et al.

(10) Patent No.: US 6,637,193 B2
(45) Date of Patent: Oct. 28, 2003

(54) EXHAUST EMISSION CONTROL DEVICE AND EXHAUST EMISSION CONTROL METHOD FOR NATURAL GAS ENGINE

(75) Inventors: Masaru Oku, Wako (JP); Hiroshi Ogasa, Wako (JP); Mari Kohno, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/088,104

(22) PCT Filed: Jun. 1, 2001

(86) PCT No.: PCT/JP01/04661
§ 371 (c)(1), (2), (4) Date: Apr. 12, 2002

(87) PCT Pub. No.: WO02/12688
PCT Pub. Date: Feb. 14, 2002

(65) Prior Publication Data
US 2002/0178715 A1 Dec. 5, 2002

(30) Foreign Application Priority Data
Aug. 2, 2000 (JP) ........................ 2000-233862

(51) Int. Cl.$^7$ ................................ F01N 3/00
(52) U.S. Cl. .................... 60/283; 60/274; 60/285; 95/143; 123/518
(58) Field of Search .................... 60/274, 283, 284, 60/285, 299; 95/99, 143; 96/112, 143, 146; 123/1 A, 3, 518, 519, 520; 422/109, 171, 173, 177; 423/213.2, 213.5

(56) References Cited

U.S. PATENT DOCUMENTS

| | | | | |
|---|---|---|---|---|
| 3,713,273 A | * | 1/1973 | Coffee | 95/143 |
| 4,528,000 A | * | 7/1985 | McGill et al. | 95/99 |
| 5,245,975 A | * | 9/1993 | Ito | 60/283 |
| 5,474,047 A | * | 12/1995 | Cochard et al. | 123/520 |
| 5,875,765 A | * | 3/1999 | Norton | 123/520 |
| 5,899,187 A | * | 5/1999 | Gruber et al. | 123/1 A |
| 5,947,063 A | * | 9/1999 | Smith et al. | 123/3 |

FOREIGN PATENT DOCUMENTS

| | | |
|---|---|---|
| JP | 59-105049 | 7/1984 |
| JP | 06-033752 | 2/1994 |
| JP | 06-264821 | 9/1994 |

* cited by examiner

*Primary Examiner*—Thomas Denion
*Assistant Examiner*—Tu M. Nguyen
(74) *Attorney, Agent, or Firm*—Arent Fox Kintner Plotkin & Kahn, PLLC

(57) ABSTRACT

A natural gas engine capable of exhaust emission control over the entire temperature range and at low costs without requiring a complicated structure. An adsorbent (7) is disposed between a fuel tank (4) and a fuel supply port (5) on a suction air passage (2), and NMOG in the fuel gas supplied to the fuel tank (4) is adsorbed by the adsorbent (7) to purify the fuel gas in advance. When the temperature of a catalyst (11) disposed on an exhaust passage (3) reaches an activation temperature, the adsorbent (7) is heated by a heater (9) to a desorption temperature to desorb NMOG from the adsorbent (7) and purify the NMOG by the catalyst (11).

6 Claims, 4 Drawing Sheets

EXHAUST EMISSION CONTROL DEVICE AND EXHAUST EMISSION CONTROL METHOD FOR NATURAL GAS ENGINE

TECHNICAL FIELD

The present invention relates to a device and to a method which are suitable for controlling exhaust emissions from engines using natural gas, such as CNG, LNG, etc., as a fuel.

BACKGROUND ART

Generally, as a means for controlling exhaust emission from the engines, a catalyst, such as a catalytic converter of rhodium, has been provided in an exhaust passage of an engine. However, such a catalyst cannot purify noxious gas when the temperature thereof does not reach an activation temperature (for example, 200° C.), and therefore, in the case in which the temperature of the exhaust emission is lower than the activation temperature, such as in the case of engine starting, or the like, the catalyst cannot sufficiently purify the exhaust emissions.

However, solutions to such problems have been attempted by techniques as described in Japanese Unexamined Utility Publication No. 60-190923 and Japanese Unexamined Patent Publication No. 63-68713. In the former, an adsorbent is provided in an exhaust passage, and unburned gas in exhaust gas at a low temperature is adsorbed by this adsorbent. In the latter, an exhaust passage is divided into a main passage and a bypass passage at the upstream of the catalyst, a switching valve is provided at a turning-point of these passages, and an adsorbent is provided in the bypass passage in order to adsorb unburned gas in the exhaust gas. These publications teach that a flow of the exhaust gas from the engine can be appropriately switched between toward the main passage and toward the bypass passage by the switching valve, depending on a temperature of the exhaust gas, and the exhaust gas can be purified in both the case of a low temperature and in the case of a high temperature.

In addition, the adsorbent has a property in which the unburned gas is adsorbed at low temperatures, the adsorption ability thereof gradually decreases with increase in temperature, and adsorption components are desorbed, for example, when the temperature reaches 80° C. Therefore, there is a problem in the prior techniques as described in the above publications, in that the unburned gas is discharged in the air and the exhaust gas is not sufficiently purified, in the case in which the temperature of the exhaust gas is in the intermediate temperature range from the desorption temperature of the adsorbent to the activation temperature of the catalyst.

As a technique for solving such a problem, a composition in which a sub-catalyst having a heater is provided in an exhaust passage in addition to the adsorbent and catalyst in order to forcibly heat by a heater, is described in Japanese Unexamined Patent Publication No. 6-33747. The publication says that in the case in which the exhaust gas temperature is in the above intermediate temperature range, the unburned gas can be purified by the sub-catalyst heated to the activation temperature by a heater.

However, there was a problem in that the structure thereof is made to be complicated and the number of parts for constructing it is increased, in order to form a purification device provided with a sub-catalyst having a heater as described above. Additionally, with respect to all the prior techniques described above, since the adsorbent is provided in an exhaust passage, the adsorbent is required to have quite good heat-resistance. Therefore, the cost thereof is increased, because most of such adsorbents are expensive.

Therefore, it is an object of the present invention to provide an exhaust emission control device and an exhaust emission control method, in which a complicated structure is not required, the cost is low, and exhaust gas can be sufficiently purified, in an engine using natural gas as a fuel.

DISCLOSURE OF THE INVENTION

An exhaust emission control device of the present invention comprises an engine using natural gas as fuel gas, a fuel tank for storing the fuel gas, a suction air passage for supplying the fuel gas from the fuel tank to the engine, an exhaust passage for discharging exhaust gas from the engine, a fuel supply port connected to the suction air passage, for supplying the fuel gas to the fuel tank, an adsorbent disposed between the fuel supply port and the fuel tank in the suction air passage, for adsorbing non-methane hydrocarbons in the fuel gas, an adsorbent heating means for heating the adsorbent, an exhaust emission control catalyst disposed in the exhaust passage, a catalyst temperature measuring means for measuring the temperature of the catalyst, and a control means for controlling the adsorbent heating means depending on the measured results obtained by the catalyst temperature measuring means.

According to this device, since the adsorbent is disposed in the suction air passage, a temperature thereof is generally maintained to be at lower than a temperature at which non-methane hydrocarbons (Non-Methane Organic Gases, hereinafter referred to as "NMOG") which are noxious components in the fuel gas, can be adsorbed, that is, the desorption temperature of the NMOGs (for example, 120° C). Here, the fuel gas passes through the adsorbent placed along the suction air passage which is a supply passage thereof, when the fuel gas is supplied from the fuel supply port to the fuel tank. Since NMOGs in the fuel gas are adsorbed on the adsorbent when the adsorbent is passed, the fuel gas stored in the fuel tank is purified by decreasing the NMOG concentration thereof. Thus, the NMOG concentration in the exhaust gas is decreased even if the temperature of the exhaust gas is at a low temperature which does not reach an activation temperature of a catalyst, since the fuel gas has already been purified when it is stored in the fuel tank. It is desirable that the adsorption capacity of the adsorbent be suitably set in comparison with the capacity of the fuel tank, so that NMOGs are reliably adsorbed by the adsorbent during the supplying of the fuel gas. As an adsorbent, specifically, activated carbon, silica gel, zeolite, etc., can be employed.

Then, because the NMOGs have been adsorbed to the adsorbent after the fuel gas is supplied, it is necessary to regenerate the adsorbent by desorbing the NMOGs and to purify the desorbed NMOGs. For that purpose, the following operation may be carried out by the control means. In the control means, the temperature of the catalyst for controlling the exhaust emission is transmitted by a catalyst temperature measuring means at all times, and when this temperature has reached the activation temperature of the catalyst, an adsorbent heating means is operated by the control means and the adsorbent is heated over a desorption temperature. Then, the NMOGs are desorbed from the adsorbent, the NMOGs reach the catalyst in an active state through the engine and are purified by the catalyst.

The device according to the present invention is characterized in that an adsorbent is disposed between a fuel tank and a fuel supply port along a suction air passage, as a first point, and in that an adsorbent heating means and a catalyst temperature measuring means are provided, and when the temperature of the catalyst has reached the activation temperature, the adsorbent is heated and NMOGs are desorbed by using a control means, as a second point. Therefore, exhaust gas from engines can be purified over the entire temperature ranges even if the engines have relatively simple structures. In addition, the adsorbent is not required to have heat-resistance because it is disposed in the suction air passage, and as a result, an inexpensive adsorbent can be used and reduction in costs can be realized.

Next, an exhaust emission control method for a natural gas engine according to the present invention relates to a process which desorbs NMOGs adsorbed to the adsorbent in the above exhaust emission control device of the present invention, and comprises of an adsorbent heating means for heating an adsorbent which is disposed in a suction air passage leading from a fuel tank for storing natural gas as fuel gas to an engine, so as to adsorb NMOGs in fuel gas, a catalyst temperature measuring means for measuring the temperature of the catalyst which is disposed in an exhaust passage for discharging exhaust gas from said engine, so as to control exhaust emission, and a control means for controlling the adsorbent heating means in accordance with the measured temperature which is supplied by the catalyst temperature measuring means, wherein the NMOGs in fuel gas flowing in the suction air passage are adsorbed by the adsorbent, the adsorbent heating means is operated by the control means, so that the adsorbent is heated over the desorption temperature at which the NMOGs are desorbed from the adsorbent, when the measured temperature in the catalyst temperature measuring means reaches the activation temperature of the catalyst.

BEST MODE FOR CARRYING OUT THE INVENTION

In the following, an embodiment of the present invention is explained with reference to the drawings.

Figure 1:
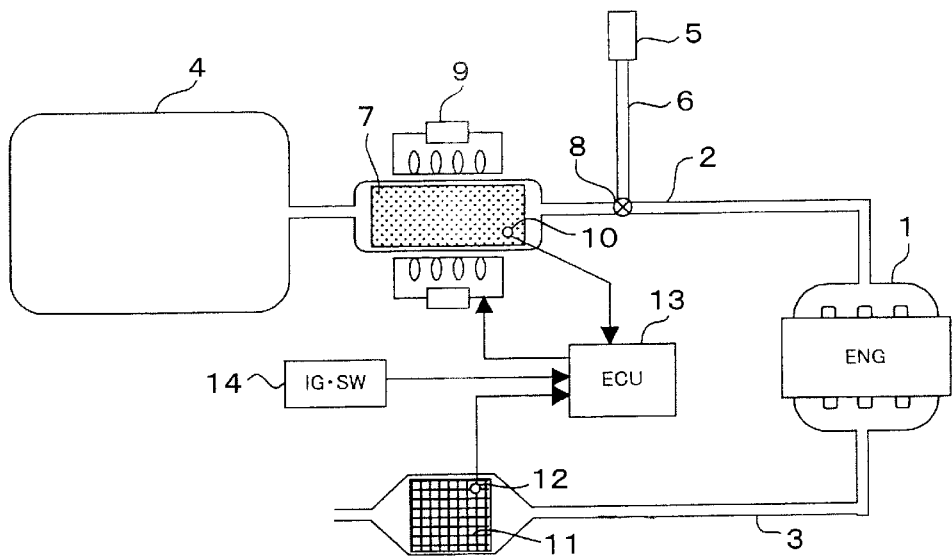
FIG. 1 shows a schematic diagram of an exhaust emission control device according to an embodiment of the present invention.

FIG. 1 shows a suction air and exhaust system of a natural gas engine which constitutes an exhaust emission control device according to an embodiment of the present invention. In the Figure, reference numeral 1 indicates an engine, reference numeral 2 indicates a suction air passage for supplying a fuel gas to the engine 1, and reference numeral 3 indicates an exhaust passage for discharging exhaust gas from the engine 1 to the air. In this case, CNG is used as a fuel gas. A fuel tank 4 is provided at the upper end of the suction air passage 2, and along the suction air passage 2, a fuel supply passage 6 which connects to a fuel supply port 5 is joined. An adsorbent 7 consisting of activated carbon, silica gel, zeolite, etc., is disposed between a junction of the fuel supply passage 6 and the fuel tank 4 in the suction air passage 2. A switching valve 8 for leading the suction air passage 2 disposed at the upper portion of the junction to the fuel supply port 5 or to the engine 1, is provided at a junction of the suction air passage 2 and the fuel supply passage 6.

The above adsorbent 7 adsorbs NMOGs included in the fuel gas, and it has characteristics in which adsorptivity thereof occurs in a lower temperature range than the desorption temperature of NMOGs (for example, 120° C.) and NMOGs are desorbed at the desorption temperature. An electric-heating heater (adsorbent heating means) 9 for heating the adsorbent 7 over the desorption temperature is provided around the adsorbent 7, and in addition, an adsorbent temperature sensor 10 for measuring the temperature of the adsorbent 7 is provided in the adsorbent 7. Furthermore, a catalyst for purifying exhaust gas (hereinafter simply referred to as "catalyst") 11, such as a catalytic converter of rhodium, is disposed in the exhaust passage 3. The catalyst 11 has a activity which purifies NMOGs in an active state after having reached an activation temperature (for example, 200° C.). In addition, in the catalyst 11, a catalyst temperature sensor 12 (catalyst temperature measuring means) which measures the temperature of the catalyst 11 (catalyst floor temperature which strictly constitutes the main part of the catalyst 11) is provided.

Reference numeral 13 in FIG. 1 indicates an electronic control device (control means, hereinafter referred to as "ECU") which is activated by an ignition switch 14 for starting the engine 1. Output signals of the adsorbent temperature sensor 10 and the catalyst temperature sensor 12 are supplied to the ECU 13. The ECU 13 controls the heater 9 depending on the operating condition of the engine 1. Specifically, when the output signal of the catalyst temperature sensor 12, that is, the temperature of the catalyst 11, reaches an activation temperature, the temperature of the adsorbent 7 is controlled to be the desorption temperature of the adsorbent 7 by turning on the heater 9. Then, after a sufficient time during which NMOGs adsorbed in the adsorbent 7 can be completely desorbed from the adsorbent 7 (for example, 20 minutes) has passed, the heater 9 is turned off. As a control procedure of the ECU 13, the heater 9 may be turned on by allowing sufficient time to pass at which the temperature of the catalyst 11 reaches an activation temperature since the starting of the engine 1 (for example, 5 minutes), instead of reaching an activation temperature of the catalyst 11.

Next, the action of the embodiment of the present invention is explained step by step from the fuel supply to the fuel tank 4 to start up and stable operation of the engine 1.

(1) Fuel Supply

In the fuel supply, the switching valve 8 leads to the fuel supply port 5, and the fuel gas is supplied from the fuel supply port 5. The fuel gas flows backward from the fuel supply passage 6 to the suction air passage 2, and it is stored in the fuel tank 4 via the adsorbent 7. When the fuel supply is finished, the switching valve 8 leads to the engine 1. For example, the switching valve 8 can be switched so that fuel gas is normally led to the engine 1 and so that it is led to the fuel supply port 5 only when a nozzle is inserted into the fuel supply port 5 and is measured by the ECU 13.

Thus, when the fuel gas stored in the fuel tank 4 passes through the adsorbent 7, NMOGs are adsorbed therein and the NMOG concentrations thereof are reduced. That is, the fuel gas has already been purified in the state stored in the fuel tank 4.

Figure 2:
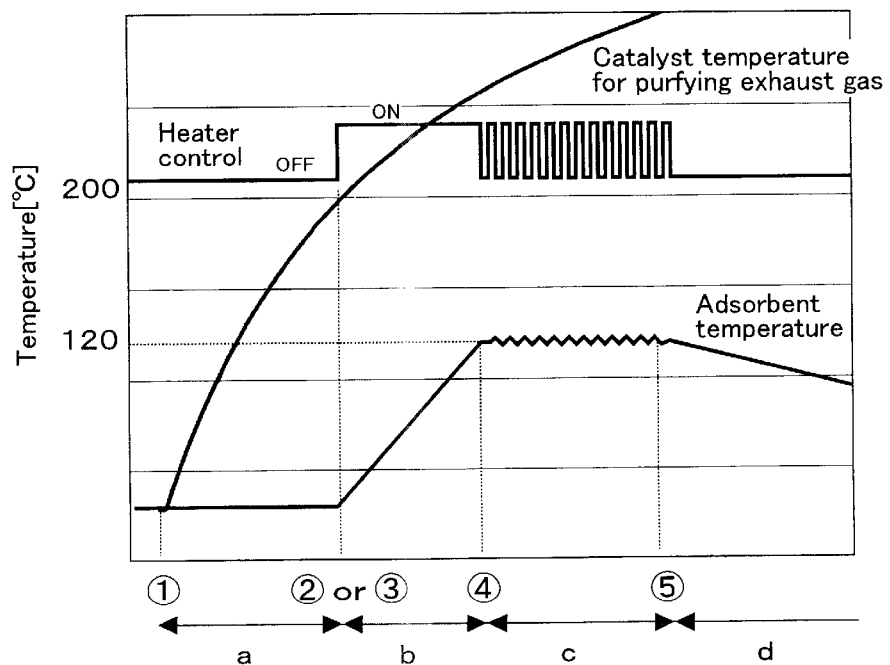
FIG. 2 shows a diagram of an operating procedure and an exhaust emission control characteristic in an exhaust emission control device according to an embodiment of the present invention.

Next, the actions from starting of the engine to stable operation is explained by referring to FIG. 2. Reference numerals ① to ⑤ in FIG. 2 correspond to timings indicated by ① to ⑤ in the following descriptions.

② Engine Start

① The engine 1 is started by the ignition switch 14.

② The catalyst 11 is heated by exhaust gas, and the adsorbent 7 is heated by turning on the heater 9 when the temperature measured by the catalyst temperature sensor 12 reaches an activation temperature of the catalyst 11.

③ Instead of the above ②, the adsorbent 7 is heated by turning on the heater 9 after sufficient time has passed for the temperature of the catalyst 11 to reach an activation temperature (for example, 5 minutes) since the starting of the engine 1

A section a between the above ① and the above ② or ③ indicates a cold start up state, and in the section a, if NMOGs remain in the fuel gas, the NMOGs are adsorbed in the adsorbents 7 in a low-temperature state. Therefore, the NMOG concentrations in the exhaust gas discharged to the air are low.

④ When the measured temperature by the adsorbent temperature sensor 10 reaches a desorption temperature of the adsorbent 7, the heater 9 is controlled so as to maintain it at that temperature. Thus, NMOGs are thereby desorbed from the adsorbent 7.

In a section b between the above ② or ③ and the above ④, NMOGs in the fuel gas are adsorbed in the adsorbent 7, and even if there were NMOGs which were not adsorbed in the adsorbent 7, the NMOGs are purified by the catalyst 11 in an active state. Therefore, the NMOG concentrations in the exhaust gas discharged to the air are low.

⑤ After sufficient time at which NMOGs adsorbed in the adsorbent 7 can be completely desorbed from the adsorbent 7 (for example, 20 minutes) has passed, the heater 9 is turned off. The adsorbent 7 is regenerated by completely desorbing NMOGs.

In a section c between the above ④ and the above ⑤, NMOGs are desorbed from the adsorbent 7; however, the NMOG concentrations in the exhaust gas discharged to the air are low, because the NMOGs are purified by the catalyst 11 in an active state. Then, a section d after the above ⑤ indicates a stable operation, and in this section d, the NMOG concentrations in the exhaust gas discharged to the air are low, because the fuel gas in the fuel tank 4 burns and is exhausted. If NMOGs remain in the fuel gas, the NMOGs are adsorbed in the adsorbent 7 in a low-temperature state or are purified by the catalyst 11 in an active state.

In the case in which the operation is continued at a light-load, and then the engine 1 is stopped when the catalyst 11 has not yet reached activation temperature, the operation condition is in the state of the section a in FIG. 2. Then, when the engine 1 is started at the next opportunity, the control is carried out from the state of the above ①. Furthermore, in the case in which the engine 1 is stopped in the middle of the section c in FIG. 2 and NMOGs are not completely desorbed from the adsorbent 7, the control is carried out from the state of the above ① by starting the engine 1 again.

An exhaust emission control device of the above embodiment and an operating method thereof are characterized in that the NMOG concentrations of fuel gas supplied to the engine 1 are previously reduced by passing the fuel gas through the adsorbent 7 during fuel supply to the fuel tank 4. Thus, NMOGs in exhaust gas discharged to the air are naturally reduced, and efficient purification of the exhaust gas can be carried out.

Next, an operation for regenerating the adsorbent 7 is required by desorbing NMOGs adsorbed in the adsorbent 7. For that purpose, the adsorbent 7 is heated to a desorption temperature by the heater 9, after the temperature of the catalyst 11 heated by exhaust gas reaches activation temperature. Thus, NMOGs desorbed from the adsorbent 7 are thereby purified by the catalyst 11 in an active state. In the following stable operation, it is not necessary to further adsorb or purify NMOGs, since the fuel gas in which the NMOG concentrations were previously reduced is continuously used. However, in the case in which NMOGs remain in the fuel gas, it is purified by the adsorbent 7 or by the catalyst 11.

An exhaust emission control device of the above embodiment is characterized in that the adsorbent 7 is disposed between the fuel tank 4 and the fuel supply port 5 in the suction air passage 2, as a first point, and in that the heater 9 and the catalyst temperature measuring sensor 12 are provided, and when the temperature of the catalyst 11 has reached an activation temperature, the adsorbent 7 is heated and NMOGs are desorbed by using the ECU 13, as a second point. Therefore, exhaust gas from the engine 1 can be purified over an entire temperature range, even if the engine 1 has a relatively simple structure. In addition, the adsorbent 7 is not required to have heat-resistance because it is disposed in the suction air passage 2, and as a result, an inexpensive adsorbent 7 can be used and a reduction in costs can be realized.

Next, a modified example of the exhaust emission control device shown in FIG. 1 is explained with reference to FIGS. 3 and 4. In these Figures, the same components as those of FIG. 1 are indicated by the same reference numerals and descriptions thereof are omitted.

Figure 3:
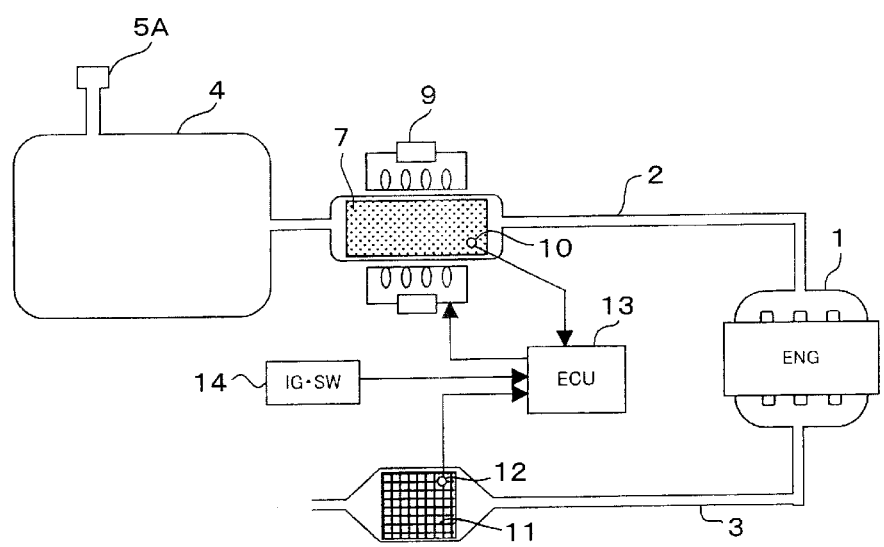
FIG. 3 shows a schematic diagram of a modified embodiment of the device shown in FIG. 1.

In a device as shown in FIG. 3, a fuel supply port 5 and a fuel supply passage 6 shown in FIG. 1 are not necessary components, and a fuel supply port 5A is directly connected to a fuel tank 4, instead of having these components. In this embodiment, when an engine 1 is started and fuel gas is supplied to the engine 1, NMOGs in the fuel gas are adsorbed in adsorbent 7 along the way thereof. Then, when a measured temperature of a catalyst temperature sensor 12 reaches an activation temperature of catalyst 11, or after a sufficient time has passed during which the temperature of the catalyst 11 has reached the activation temperature since the engine 1 was started, the adsorbent 7 is heated by turning on a heater 9. When measured temperature by an adsorbent temperature sensor 10 reaches a desorption temperature of the adsorbent 7, the heater 9 is controlled so as to maintain the temperature. NMOGs are thereby desorbed from the adsorbent 7, and the NMOGs are purified by the catalyst 11 in an active state after passing through the engine 1. Then, after sufficient time has passed during which the NMOGs adsorbed in the adsorbent 7 are completely desorbed from the adsorbent 7, the heater 9 is turned off. Thus, the adsorbent 7 is regenerated by completely desorbing the NMOGs, and NMOGs in the fuel gas are adsorbed in the regenerated adsorbent 7 again. In the case in which the capacity of the adsorbent 7 which adsorbs NMOGs was exceeded and it was saturated, NMOGs passed through the adsorbent 7 without being adsorbed therein; however, the NMOGs are purified by the catalyst 11.

In the embodiment shown in FIG. 3, NMOGs in fuel gas are adsorbed in the adsorbent 7 during cold start up of the engine 1, the NMOGs are desorbed from the adsorbent 7 and are purified by the catalyst 11 when the catalyst 11 is activated, and NMOGs are purified by the catalyst 11 in the following stable operation. Since the NMOGs are saturated in the adsorbent 7 in the stable operation, it is desirable that, for example, NMOGs be desorbed by heating the adsorbent 7 in each specific period of time, or by heating the adsorbent 7 after stopping the engine 1. This embodiment is different from the above embodiment in which NMOGs are adsorbed in the adsorbent 7 in a fuel gas supply process, and it is not necessary for the capacity of the adsorbent 7 to be suitably set in comparison with the capacity of the fuel tank 4, because NMOGs in fuel gas which flows from the fuel tank 4 to the engine 1 are adsorbed in the adsorbent 7 during cold start up of the engine 1. That is, because the capacity of the adsorbent 7 is sufficient only if it can absorb NMOGs in the cold start up of the engine 1, the capacity can be reduced, and as a result, miniaturization of the device can be realized.

Figure 4:
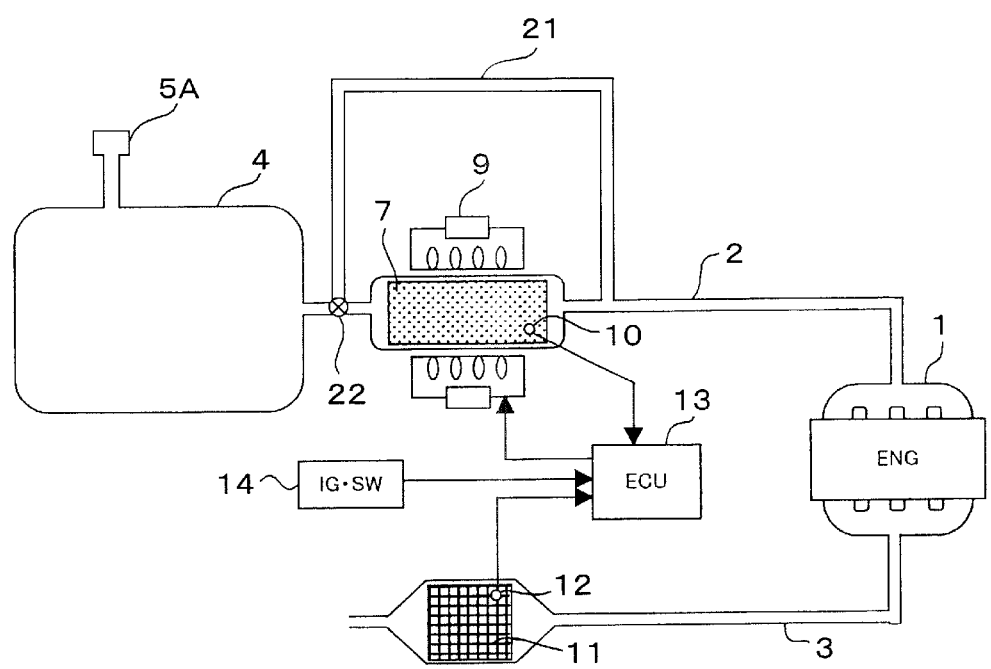
FIG. 4 shows a schematic diagram of another modified embodiment of the device shown in FIG. 1.

In a device as shown in FIG. 4, a bypass 21 for detouring around adsorbent 7 is provided along a suction air passage 2 in the device shown in FIG. 3, and in addition, a switching valve 22 in which the flow of the fuel gas is switched to the adsorbent 7 or the bypass 21 is provided at a function of the bypass 21 and upstream of the adsorbent 7. In this embodiment, in the case in which an engine 1 is in a cold start up and catalyst 11 is not yet in an active state, the fuel gas flows to the adsorbent 7 and NMOGs are adsorbed in the adsorbent 7. Then, after the catalyst 11 has reached an activation temperature, the switching valve 22 is switched to the bypass 21, and the NMOGs are desorbed by heating the adsorbent 7 using a heater 9. In the following process, this condition is maintained, and the adsorbent 7 is always made to be in the regeneration condition and the NMOGs are purified in the catalyst 11. In this embodiment, because the fuel gas passes through the adsorbent 7 only during cold start up of the engine 1, the adsorbent 7 is not easily deteriorated and flow resistance of the fuel gas by passing the adsorbent 7 is reduced. Furthermore, in the same way as in the embodiment shown in FIG. 3, the capacity of the adsorbent 7 is sufficient only if it can absorb NMOGs in the cold start up of the engine 1, and in addition, the NMOGs are not adsorbed by the adsorbent 7 at all after the cold start up. Therefore, the capacity of the adsorbent 7 can be further reduced and further miniaturization of the device can be realized. Such aspects which are provided with the bypass 21 can be applied to the device shown in FIG. 1.

EXAMPLES

Next, effects of the present invention were verified by explaining an example of the present invention.

Example

Using an exhaust emission control device shown in FIG. 1, an operation test was carried out according to the following time schedule.

Stop of the engine 1 over 20 hours

Operation of the engine 1 corresponding to a 15 mile continuous run (TRY1)

Stop of the engine 1 for 5 minutes

Operation of the engine 1 corresponding to a 15 mile continuous run (TRY2)

Stop of the engine 1 for 5 minutes

Operation of the engine 1 corresponding to a 15 mile continuous run (TRY3)

In the TRY1 to TRY3 in the above schedule, outputs of NMOGs included in exhaust gas were measured.

Comparative Example

Using an exhaust emission control device in which an adsorbent 7 and a heater 9 are removed from the construction shown in FIG. 1, outputs of NMOGs included in exhaust gas were measured in the same manner as in the Example.

Figure 5:
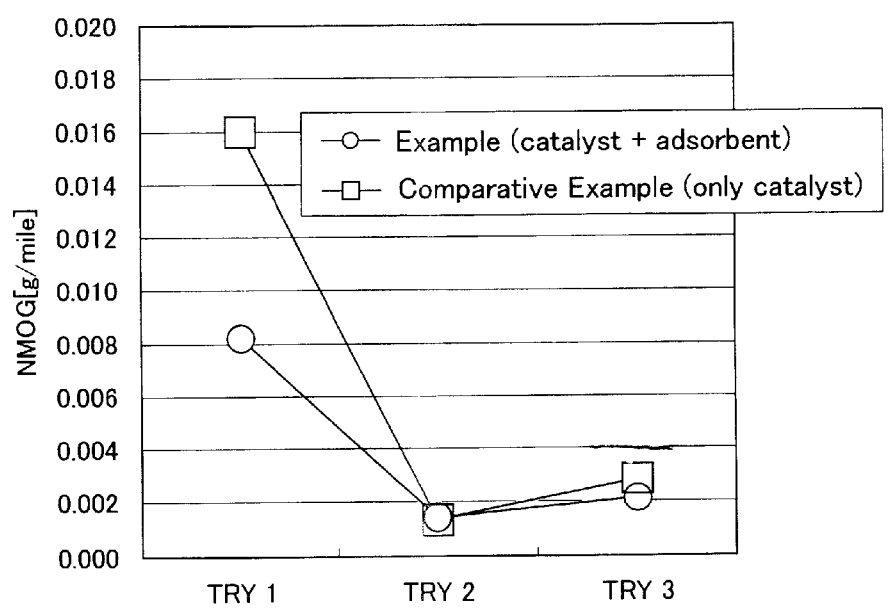
FIG. 5 shows a diagram of measured results of an Example of the present invention and a Comparative Example.

The measured results of the above Example and the Comparative Example are shown in FIG. 5.

The Example and Comparative Example will be evaluated by referring to FIG. 5.

(TRY1)

This step is in a run starting, and in the Comparative Example, output of NMOGs is large because the catalyst 11 has not reached the activation temperature in an initial stage. In contrast, in the Example, output of NMOGs are less than that of the Comparative Example because the NMOGs are adsorbed by the adsorbent 7 in the case in which the catalyst 11 has not reached the activation temperature.

(TRY2, TRY3)

In the case of the Example, NMOGs are desorbed from the adsorbent 7 which has reached the desorption temperature by heating, and the NMOGs are purified by the catalyst 11 in an active state. In contrast, in the case of the Comparative Example, although NMOGs are included in the exhaust gas from the engine 1, the NMOGs are purified by the catalyst 11 in an active state. Therefore, both outputs of NMOGs in the Example and in the Comparative Example are therefore small in the operation conditions of TRY2 and TRY3.

As is apparent from the above results, it was confirmed that the Example could hold down the outputs of NMOGs, in particular, in an engine starting.

As explained above, according to the present invention, outputs of NMOGs in exhaust gas can be reduced over the entire temperature range and the exhaust gas can be sufficiently purified at low cost without requiring a complicated structure.

What is claimed is:

1. An exhaust emission control device comprising:

an engine using natural gas as fuel gas, a fuel tank for storing said fuel gas, a suction air passage for supplying said fuel gas from said fuel tank to said engine, an exhaust passage for discharging exhaust gas from said engine, a fuel supply port connected to said suction air passage, for supplying said fuel gas to said fuel tank an adsorbent disposed at an intermediate portion of said suction air passage, for adsorbing non-methane hydrocarbon in said fuel gas, an adsorbent heating means for heating said adsorbent, an exhaust emission control catalyst disposed in said exhaust passage, a catalyst temperature measuring means for measuring a temperature of a catalyst, and a control means for controlling activation of said adsorbent heating means based on an activation temperature of said catalyst as obtained by said catalyst temperature measuring means.

2. The exhaust emission control device according to claim 1, wherein a switching valve is provided between said fuel tank and said absorbent, and said switching valve and a portion of said suction air passage between said adsorbent and said engine is connected to each other by a bypass passage.

3. An exhaust emission control device comprising:

an engine using natural gas as fuel gas, a fuel tank for storing said fuel gas, a suction air passage for supplying said fuel gas from said fuel tank to said engine, an exhaust passage for discharging exhaust gas from said engine, a fuel supply port connected to said suction air passage, for supplying said fuel gas to said fuel tank an adsorbent disposed between said fuel supply port and said fuel tank in said suction air passage, for adsorbing non-methane hydrocarbon in said fuel gas, an adsorbent heating means for heating said adsorbent, an exhaust emission control catalyst disposed in said exhaust passage, a catalyst temperature measuring means for measuring a temperature of a catalyst, and a control means for controlling activation of said adsorbent heating means based on an activation temperature of said catalyst as obtained by said catalyst temperature measuring means.

4. The exhaust emission control device according to claim 3, wherein said fuel gas passes through said adsorbent when the fuel gas is provided to the fuel tank and the fuel gas is provided from the fuel tank to the engine.

5. An exhaust emission control method comprising:

an adsorbent heating means for heating an adsorbent which is disposed in a suction air passage leading from a fuel tank for storing natural gas as fuel gas to an engine, so as to adsorb non-methane hydrocarbons in fuel gas, a catalyst temperature measuring means for measuring a temperature of a catalyst which is disposed in an exhaust passage for discharging exhaust gas from said engine, so as to control exhaust emission, and a control means for controlling activation of said adsorbent heating means in accordance with an activation temperature of said catalyst as indicated by a temperature measurement which is supplied by said catalyst temperature measuring means, wherein said non-methane hydrocarbon in fuel gas flowing in said suction air passage is adsorbed by said adsorbent, and when said measured temperature in said catalyst temperature measuring means reaches to said activation temperature of said catalyst, said adsorbent heating means is operated by said control means, so that said adsorbent is heated over a desorption temperature in which said non-methane hydrocarbon is desorbed from said adsorbent.

6. The exhaust emission control device according to claim 5, wherein said fuel gas passes through said adsorbent when the fuel gas is provided to the fuel tank and the fuel gas is provided from the fuel tank to the engine.

* * * * *